Figure 1:
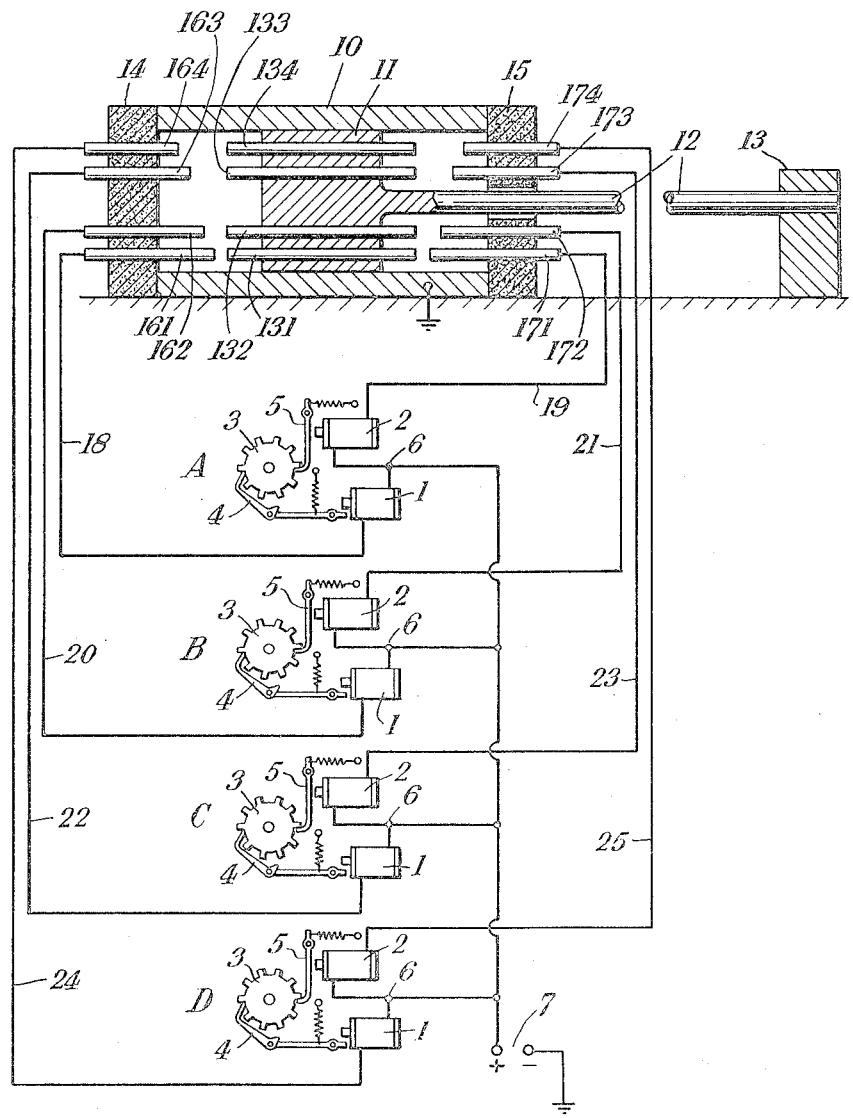

Oct. 4, 1955  J. B. LAMBIE  2,719,428
STRAIN RECORDING INSTRUMENT
Filed Nov. 8, 1954  2 Sheets-Sheet 1

INVENTOR
John B. Lambie
By Watson, Cole, Grindle & Watson
ATTORNEYS

Oct. 4, 1955    J. B. LAMBIE    2,719,428
STRAIN RECORDING INSTRUMENT
Filed Nov. 8, 1954    2 Sheets-Sheet 2

INVENTOR
John B. Lambie
By Watson, Cole, Grindle & Watson
ATTORNEYS

United States Patent Office 2,719,428
Patented Oct. 4, 1955

2,719,428

STRAIN RECORDING INSTRUMENT

John Brown Lambie, Weybridge, England, assignor to Vickers-Armstrongs Limited, London, England Application November 8, 1954, Serial No. 467,572

Claims priority, application Great Britain November 27, 1953

6 Claims. (Cl. 73—88.5)

This invention has for its object to provide an improved instrument for recording the number of times a given strain or deflection range in a test-piece exceeds a predetermined value, being primarily (though not exclusively) intended for investigating the magnitude and frequency of loads applied to an aircraft structure for the purpose of enabling more accurate prediction of fatigue life of the stressed or deflected member than has hitherto been possible.

An instrument according to the invention comprises two carriers adapted to be fixed respectively to two spaced parts of a test-piece and capable of relative sliding movement in the direction of the strains to be measured, one of said carrier members having one or more contactors slidably mounted therein so as to project at each end thereof, and the other carrier member having mounted therein opposite each end of said slidable contactor or contactors a corresponding number of fixed contactors, the ends of said fixed contactors (in the case of a plurality of slidable contactors) being of progressively greater distance from the ends of the slidable contactors so that when one carrier member moves in relation to the other due to strain on the test-piece, the slidable contactors impinge successively against the fixed contactors, whereby electrical indicating or recording mechanism connected to the fixed contactors is energised accordingly.

The instrument is intended to be used in conjunction with electrical counters of the kind incorporating both cocking coils and actuating coils, the cocking coils of the counters being connected respectively in circuit with one set of the fixed contactors and the actuating coils being connected respectively in circuit with the other set of the fixed contactors. Thus, each counter is actuated to signalize a strain only after the relative cocking coil has been energised by relative movement of the carrier members in one direction followed by the energisation of the actuating coil thereof when said carrier members move relatively to the required extent in the opposite sense. In this way it is possible to ensure that a record is made only of the times the test-piece has been deflected through a given range, and by employing a sufficient number of slidable contactors (together with the two sets of fixed contactors to correspond thereto), each of which slidable contactors relates to a different degree of strain range according to the length of the associated fixed contactors, it is possible to measure the number of times a given strain range value has been exceeded.

Figure 2:
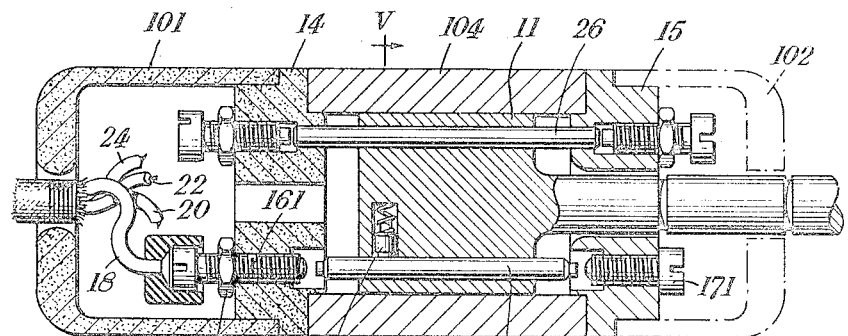
Figure 3:
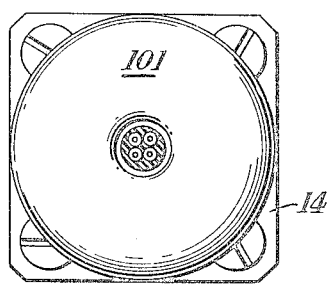
Figure 4:
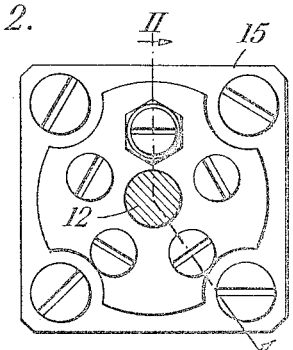
Figure 5:
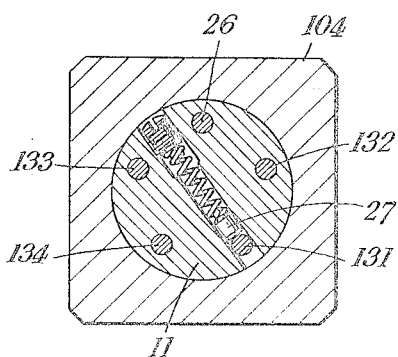
Figure 6:
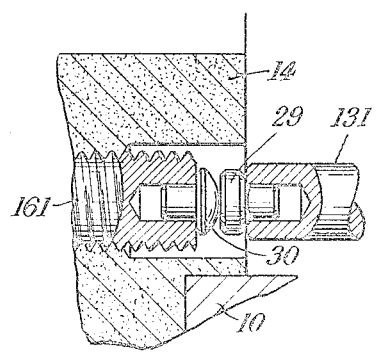

The manner in which the invention may be carried into effect is hereinafter described with reference to the accompanying drawings, of which Fig. 1 is a diagram illustrating the principle in accordance with which the device operates, and the counter circuit with which it is associated, Fig. 2 is a longitudinal section (taken on the line II—II of Fig. 4) of one form of instrument embodying the invention, Fig. 3 is an end elevation thereof as viewed from the left-hand end of Fig. 2, Fig. 4 an end elevation thereof as viewed from the right hand end of Fig. 2 (the end-cap shown in chain-dotted lines in Fig. 2 having been removed), Fig. 5 is a transverse section taken on the line V—V of Fig. 2, and Fig. 6 is a detailed section, drawn to a larger scale, of the cooperating contacts of a fixed contactor and a sliding contactor.

As will be seen from Fig. 1, the instrument takes the form of a cylinder 10, which constitutes one carrier member, and in which is slidable a piston 11, which constitutes the other carrier member, the piston being fixed to a rod 12 which extends axially through the cylinder 10 to be connected to a part, such as the lug 13, of the test-piece at a point spaced from the point of anchorage of the cylinder 10. The instrument is oriented so that the direction of sliding movement of the piston 11 in the cylinder is aligned with the direction of the strain to be measured.

The piston 11 is drilled parallel to its axis at four points, providing holes in which are slidably mounted four rods 131, 132, 133, 134, all of which project to a substantial extent beyond each face of the piston. The respective ends of the cylinder 10 are provided with bulk-heads 14 and 15, respectively carrying sets of four fixed contactor rods 161, 162, 163 and 164, and 171, 172, 173 and 174, which are of corresponding relative disposition to the four rods 131, 132, 133 and 134 in the piston 11. The rods 161, etc. or 171, etc. of each set project inwardly from their respective bulk-heads by different amounts. Each rod 161, etc. in the bulk-head 14 is matched by a rod 171, etc. in the bulk-head 15, and the rods of each matching pair project inwardly towards the piston by the same amount.

Associated with the contactor instrument are four counters generally designated by the reference letters A, B, C and D. Each such counter incorporates a cocking coil 1, an actuating coil 2, and an escapement wheel 3 which is adapted to be operated by a ratchet 4 connected with the cocking coil, and which is controlled by a detent 5 connected with the actuating coil. The fixed contact rods of each matched pair are connected respectively to the cocking and actuating coils of a counter; that is to say, the rods 161, 171 are connected by the lines 18, 19 with the coils 1 and 2 of the counter A, the rods 162, 172 are connected by the lines 20, 21 with the coils 1 and 2 of the counter B, the rods 163, 173 are connected by the lines 22, 23 with the coils 1 and 2 of the counter C, and the rods 164, 174 are connected by the lines 24, 25 with the coils 1 and 2 of the counter D. The cylinder 10 and the common terminals 6 of the counters A, B, C and D are earthed. The circuit incorporates a source of current at 7.

As will be understood, the counters are operated by successive energisation of the coils 1 and 2, a current through the cocking coil 1 being effective to set the ratchet 4 so that when a current flows subsequently through the actuating coil 2 the detent 5 is moved out of its normal position, releasing the wheel 3 for operation by the ratchet 4, whereby the counter is caused to register once. It will therefore be seen that a deflection of the test-piece through a distance represented by the sum of the spaces between the rods 161, 171 and the slidable contactor 131 which cooperates therewith will be recorded when the piston 11 has moved relatively to the cylinder 10 to an extent sufficiently to close in turn the circuits of the fixed contactors 161 and 171, and that deflections of greater magnitude will be recorded by the counters B, C and D of the pairs of contacts 162, 172; 163, 173; and 164, 174, the continued movement of the piston being permitted by the fact that the contactors 131, 132, 133 and 134 are capable of sliding therein as each in turn impinges upon the fixed contactor opposite thereto.

In the preferred form of instrument shown in Figs. 2 to 6, the cylinder 10 includes a centre section 104, the bulkheads 14, 15 and two end caps 102, 103. The slidable contactor rods are arranged in the piston 11 equiangularly about the axis, only one of such rods being shown at 131, and the piston is prevented from rotating relatively to the cylinder by means of a guide-rod 26 which passes through the piston and is fixed in the bulk-heads 14, 15. A spring-loaded brake-shoe 27, housed in a hole drilled in the piston 11 at right angles to the axis, is arranged to bear against the side of each of the slidable contactor rods 131, etc., in order to hold the latter against movement due to inertia loads.

The fixed contactors in the bulk-heads 14, 15 are constituted by setscrews 161, 171, etc. and the extent to which these project towards the piston 11, according to the degrees of strain which it is desired to record, may be adjusted by screwing them into or out of their tapped sockets; they may be fixed in position by the locknuts 28. As shown in Fig. 6, the contactors 131, etc. and 161, etc. are provided with platinum contacts 29 and 30.

What I claim as my invention and desire to secure by Letters Patent is:

1. An instrument for use in conjunction with electrical counting mechanism in recording strains in a test-piece, comprising two carriers adapted to be fixed respectively to two spaced parts of a test-piece and capable of relative sliding movement in the direction of the strains to be measured, one of said carrier members having a plurality of contactors slidably mounted therein so as to project at each end thereof, and the other carrier member having mounted therein opposite each end of said slidable contactors a corresponding number of fixed contactors, the ends of said fixed contactors being of progressively greater distance from the ends of the slidable contactors so that when one carrier member moves in relation to the other due to strain on the test-piece, the slidable contactors impinge successively against the fixed contactors whereby, electrical connections being made between said fixed contactors and electrical counting mechanism, said mechanism will be energised accordingly.

2. An instrument as claimed in claim 1, wherein the carrier members are respectively constituted by a cylinder and a piston slidable therein, said slidable contactors being carried by said piston in a manner in which each contactor is slidable relatively to the others and to the piston in the direction of the sliding movement of the piston, and the cylinder having on either side of the piston a support carrying fixed contactors projecting towards the ends of the sliding contactor rods of the piston, the piston and the cylinder being separately attachable to spaced parts of the test-piece.

3. An instrument as claimed in claim 2, comprising means for restraining the slidable contactors against endwise movement due to inertia loads.

4. An instrument as claimed in claim 2, comprising means for preventing rotation of the piston in the cylinder.

5. An instrument as claimed in claim 2, comprising means for adjusting the fixed contactors so that the extent of their projection from their supports towards the piston may be varied to be adapted for recording different degrees of strain.

6. In an instrument for recording strains in a test-piece and operable in conjunction with an electrical counting mechanism which renders an operative count in response to at least two successive impulses, the improvement comprising two carriers adapted to be fixed respectively to two spaced parts of a test-piece and capable of relative sliding movement in the direction of the strains to be measured, one of said carriers having at least a single contactor slidably mounted therein so as to project at each end thereof, a fixed contactor associated with each end of said slidable contactor and mounted on the other of said carriers, and an electrical energizing circuit including said contactors and connected to actuate said counter in response to the successive contacting of said fixed contactors by said slidable contactor.

References Cited in the file of this patent

UNITED STATES PATENTS

| | | |
|---|---|---|
| 2,636,382 | Martin | Apr. 28, 1953 |
| 2,647,396 | Aller | Aug. 4, 1953 |